United States Patent
Kuwabara et al.

(10) Patent No.: US 7,700,922 B2
(45) Date of Patent: Apr. 20, 2010

(54) CASSETTE DEVICE AND CASSETTE STORAGE BAG FOR CASSETTE DEVICE

(75) Inventors: Takeshi Kuwabara, Kanagawa (JP); Eiichi Kito, Kanagawa (JP); Tsuyoshi Tanabe, Kanagawa (JP); Takuya Yoshimi, Kanagawa (JP); Kazuharu Ueta, Tokyo (JP); Makoto Iriuchijima, Gunma (JP); Yasunori Ohta, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 12/219,480

(22) Filed: Jul. 23, 2008

(65) Prior Publication Data
US 2009/0026376 A1 Jan. 29, 2009

(30) Foreign Application Priority Data
Jul. 23, 2007 (JP) ............................. 2007-190649
Jun. 5, 2008 (JP) ............................. 2008-147922

(51) Int. Cl.
*G01T 1/24* (2006.01)
(52) U.S. Cl. .................. 250/370.08; 343/814; 343/916
(58) Field of Classification Search ............ 250/370.08; 343/771, 814, 870, 916
See application file for complete search history.

(56) References Cited

U.S. PATENT DOCUMENTS

| 4,961,502 | A | * | 10/1990 | Griffiths | 206/455 |
|---|---|---|---|---|---|
| 5,185,776 | A | * | 2/1993 | Townsend | 378/167 |
| 5,446,779 | A | * | 8/1995 | Ohta et al. | 378/182 |
| 5,466,561 | A | * | 11/1995 | Rantanen | 430/347 |
| 5,712,486 | A | * | 1/1998 | Soltani et al. | 250/484.4 |
| 6,046,458 | A | * | 4/2000 | Rantanen | 250/485.1 |
| 6,945,713 | B2 | * | 9/2005 | Vraa et al. | 396/511 |
| 7,311,526 | B2 | * | 12/2007 | Rohrbach et al. | 439/39 |
| 2002/0017610 | A1 | * | 2/2002 | Takemoto | 250/370.09 |
| 2002/0060300 | A1 | * | 5/2002 | O'kane et al. | 250/515.1 |
| 2003/0021383 | A1 | * | 1/2003 | Masson et al. | 378/177 |
| 2003/0077408 | A1 | * | 4/2003 | Haskin | 428/35.4 |
| 2004/0066366 | A1 | * | 4/2004 | Jung et al. | 345/156 |
| 2004/0079889 | A1 | * | 4/2004 | Funabashi | 250/370.01 |
| 2005/0100251 | A1 | * | 5/2005 | Havens et al. | 383/107 |
| 2005/0130389 | A1 | * | 6/2005 | Yamazaki et al. | 438/455 |
| 2006/0038134 | A1 | * | 2/2006 | Kohda et al. | 250/483.1 |

(Continued)

FOREIGN PATENT DOCUMENTS

JP 07-140255 6/1995

(Continued)

*Primary Examiner*—David P Porta
*Assistant Examiner*—Djura Malevic
(74) *Attorney, Agent, or Firm*—Jean C. Edwards, Esq.; Akerman Senterfitt

(57) ABSTRACT

A cassette device includes a radiation detecting cassette having a radiation detector therein for detecting radiation having passed through a subject and converting the detected radiation into radiation image information, a transmission and reception controller connected to the radiation detector for transmitting the radiation image information to an image processor by way of wireless communications, and a cassette storage bag for storing the radiation detecting cassette therein. The cassette storage bag includes an antenna incorporated therein for transmitting the radiation image information from the transmission and reception controller to the image processor by way of wireless communications. The transmission and reception controller and the antenna are capable of being electrically connected to each other through detachable connectors.

11 Claims, 9 Drawing Sheets

U.S. PATENT DOCUMENTS

2006/0097177 A1* 5/2006 Yamamoto ............. 250/370.08
2006/0204398 A1* 9/2006 Bales ......................... 422/28
2007/0272873 A1* 11/2007 Jadrich et al. .......... 250/370.11
2008/0292060 A1* 11/2008 Leblans et al. ............... 378/167

FOREIGN PATENT DOCUMENTS

| | | |
|---|---|---|
| JP | 2000-105297 | 4/2000 |
| JP | 2001-224579 | 8/2001 |

* cited by examiner

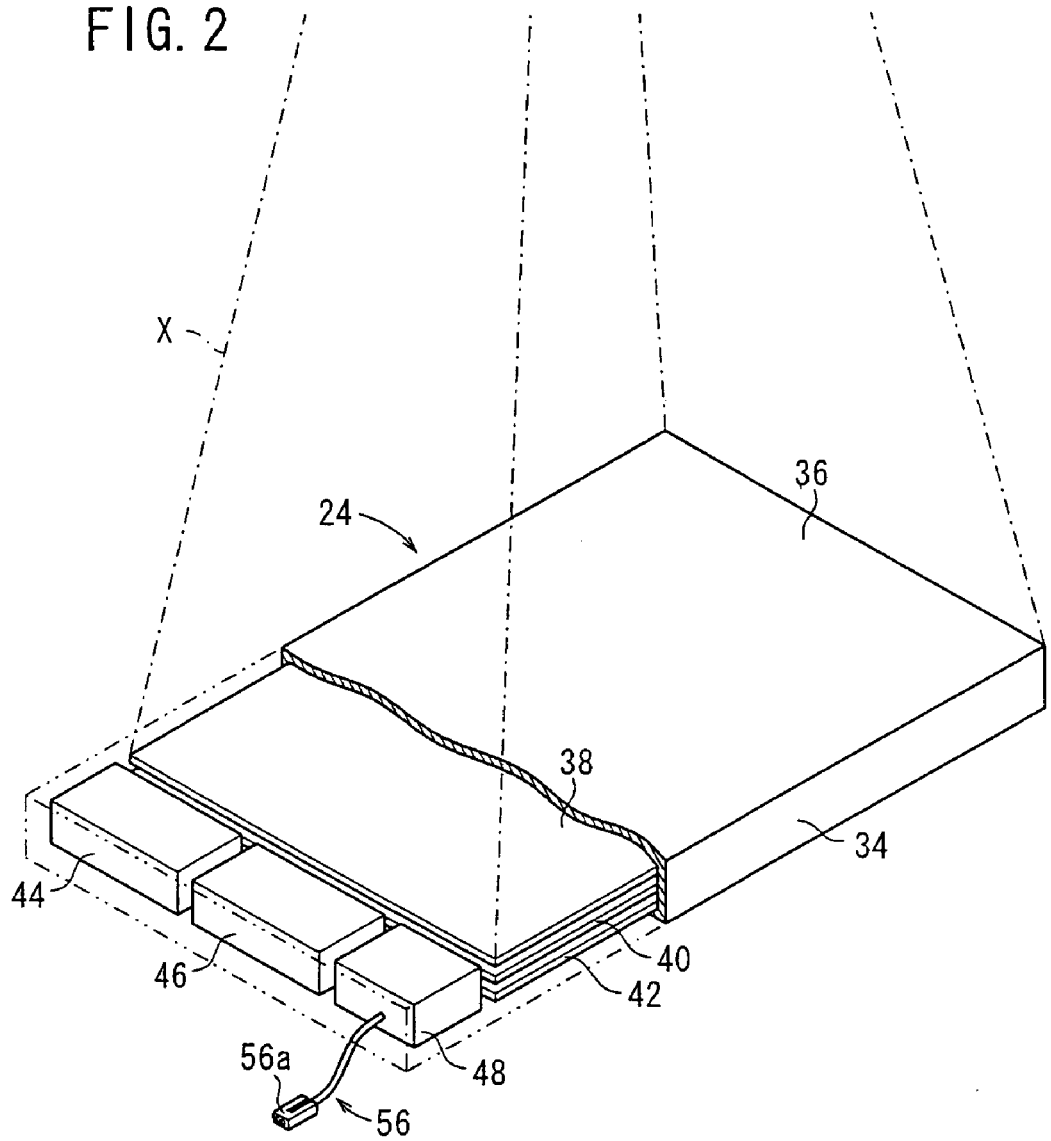

CASSETTE DEVICE AND CASSETTE STORAGE BAG FOR CASSETTE DEVICE

CROSS-REFERENCE TO RELATED APPLICATIONS

The present application claims priority from Japanese Patent Application Nos. 2007-190649, filed Jul. 23, 2007, and 2008-147922, filed Jun. 5, 2008, the contents of both of which are herein incorporated by reference in their entirety.

BACKGROUND OF THE INVENTION

1. Field of the Invention

The present invention relates to a cassette storage bag for storing a radiation detecting cassette having a transmitting means for transmitting radiation image information, which is generated when radiation is detected, to an image processing means by way of wireless communications. The invention also relates to a cassette device equipped with such a cassette storage bag.

2. Description of the Related Art

In the medical field, there have widely been used radiation image capturing apparatuses, which apply radiation to a subject and guide the radiation that has passed through the subject to a radiation conversion panel, which captures a radiation image from the radiation. Known forms of the radiation conversion panel include a conventional radiation film for recording a radiation image by way of exposure, and a stimulable phosphor panel for storing radiation energy representing a radiation image in a phosphor, and then reproducing the radiation image as stimulated light by applying a stimulating light to the phosphor.

The radiation film, with a recorded radiation image therein, is supplied to a developing device to develop the radiation image. Alternatively, the stimulable phosphor panel is supplied to a reading device to read the radiation image as a visible image.

In an operating room or the like, it is necessary to read a recorded radiation image immediately from a radiation conversion panel after the radiation image has been captured, for the purpose of quickly and appropriately treating the patient. As a radiation conversion panel that meets such a requirement, there has been developed a radiation detector having solid-state detectors for converting radiation directly into electric signals or for converting radiation into visible light with a scintillator, and then converting the visible light into electric signals in order to read the detected radiation image.

Japanese Laid-Open Patent Publication No. 2001-224579 discloses a radiation detecting cassette (electronic cassette) from which radiation image information, generated by a radiation detector of the type referred to above, is transmitted to an image processing means via a wireless transmission system.

Depending on the shape, structure, etc., of the radiation detecting cassette that is combined with the wireless transmission system, it may be difficult for the radiation detecting cassette to incorporate an antenna therein for effecting wireless communications according to specifications for frequency and wavelength used in wireless communications. Furthermore, since the radiation detecting cassette needs to house various circuit boards, an antenna, a battery, and a memory within the casing for performing wireless communications, the radiation detecting cassette tends to be structurally complex, heavy, and highly costly to manufacture.

SUMMARY OF THE INVENTION

A general object of the present invention is to provide a cassette device, which is structurally simple and lightweight, for transmitting radiation image information converted by a radiation conversion panel by way of wireless communications, as well as to provide a cassette storage bag that serves as part of such a cassette device.

A major object of the present invention is to provide a cassette device, which is designed according to specifications enabling compatibility with the frequency and wavelength used for wireless communications, as well as to provide a cassette storage bag that serves as part of such a cassette device.

Another object of the present invention is to provide a cassette device, which enables an antenna for wireless communications to be incorporated therein according to a desired layout, as well as to provide a cassette storage bag that serves as part of such a cassette device.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 2 is a perspective view, partially cut away, showing internal structural details of a radiation detecting cassette of the cassette device shown in FIG. 1;

DESCRIPTION OF THE PREFERRED EMBODIMENTS

Cassette devices according to preferred embodiments of the present invention, in association with a radiation image capturing system, will be described in detail below with reference to the accompanying drawings.

Figure 1:
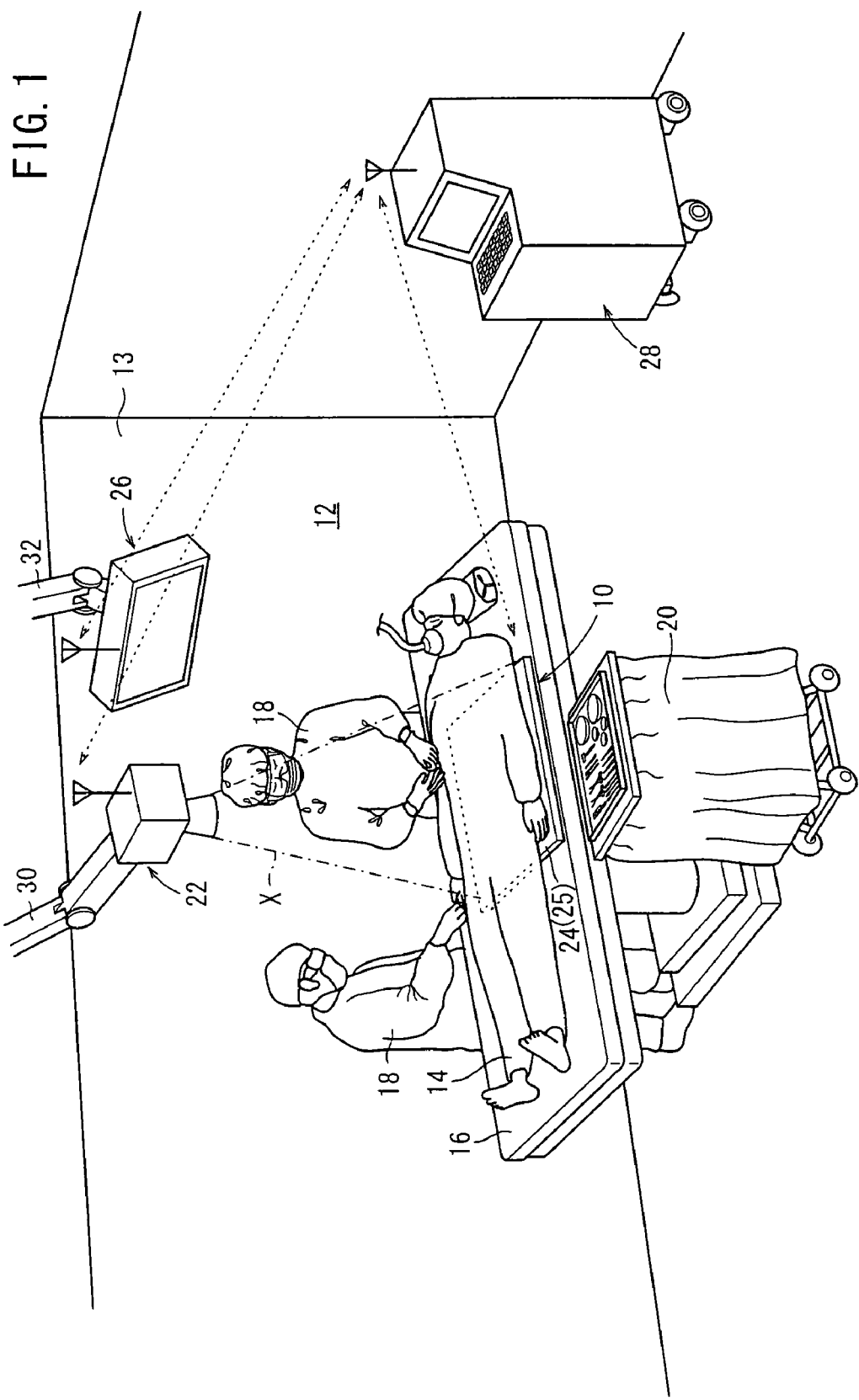
FIG. 1 is a perspective view of an operating room incorporating a radiation image capturing system, which employs a cassette device according to an embodiment of the present invention.

FIG. 1 shows in perspective an operating room 13 incorporating a radiation image capturing system 12 therein, which employs a cassette device 10 according to an embodiment of the present invention. As shown in FIG. 1, the operating room 13 has, in addition to the radiation image capturing system 12, a surgical table 16 for a patient 14 to lie on, and an instrument table 20 disposed on one side of the surgical table 16 for placement of various tools and instruments to be used by surgeons 18 for operating on the patient 14. The surgical table 16 is surrounded by various devices required for surgical operations, including an anesthesia apparatus, an aspirator, an electrocardiograph, a blood pressure monitor, etc.

The radiation image capturing system 12 includes an image capturing apparatus 22 for irradiating the patient 14 with radiation X at a dose according to image capturing conditions, a cassette device 10 comprising a radiation detecting cassette 24 housing therein a radiation detector, to be described later, for detecting the radiation X that has passed through the patient 14, and a cassette storage bag 25 in which the radiation detecting cassette 24 is stored, a display device 26 for displaying a radiation image based on the radiation X that is detected by the radiation detector, and a console 28 for controlling the image capturing apparatus 22, the cassette device 10 (including the radiation detecting cassette 24), and the display device 26. The image capturing apparatus 22, the cassette device 10, the display device 26, and the console 28 are configured to send and receive signals by way of wireless communications.

The image capturing apparatus 22 is coupled to a universal arm 30 so as to be movable to a desired position for capturing images of a desired region of the patient 14, and also to be retractable to a position out of the way of the surgeons 18 who are performing a surgical operation on the patient 14. Similarly, the display device 26 is coupled to a second universal arm 32 so as to be movable to a position where the surgeons 18 can easily confirm the captured radiation image, which is displayed on the display device 26.

FIG. 2 shows internal structural details of the radiation detecting cassette 24 of the cassette device 10. As shown in FIG. 2, the radiation detecting cassette 24 has a casing 34 made of a material that is permeable to the radiation X. The casing 34 houses therein a grid 38 for removing scattered rays of the radiation X from the patient 14, a radiation detector (radiation conversion panel) 40 for detecting the radiation X that has passed through the patient 14, and a lead plate 42 for absorbing back scattered rays of the radiation X. The grid 38, the radiation detector 40 and the lead plate 42 are arranged successively in the order named from a surface 36 of the casing 34 that is irradiated with the radiation X. The irradiated surface 36 of the casing 34 may also be constituted by the grid 38.

The casing 34 also houses therein a battery 44 serving as a power supply for the radiation detecting cassette 24, a cassette controller 46 for energizing the radiation detector 40 with electric power supplied from the battery 44, and a transmission and reception controller (transmitting unit) 48 for sending and receiving signals, including information of the radiation X detected by the radiation detector 40, to and from the console 28. A shield plate of lead or the like preferably should be placed over side surfaces of the cassette controller 46 and the transmission and reception controller 48, which are located under the irradiated surface 36 of the casing 34, in order to protect the cassette controller 46 and the transmission and reception controller 48 against damage, which might otherwise be caused if such locations were irradiated with the radiation X.

Figure 3A:
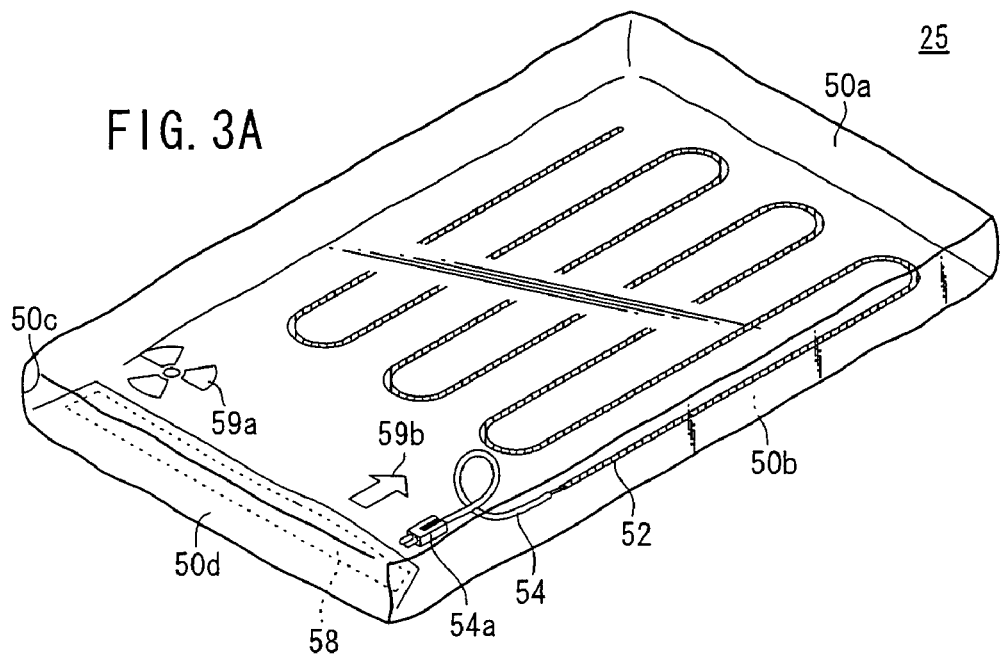
FIG. 3A is a perspective view of a cassette storage bag that serves as part of the cassette device shown in FIG. 1, the cassette storage bag being viewed from a front side thereof.
Figure 3B:
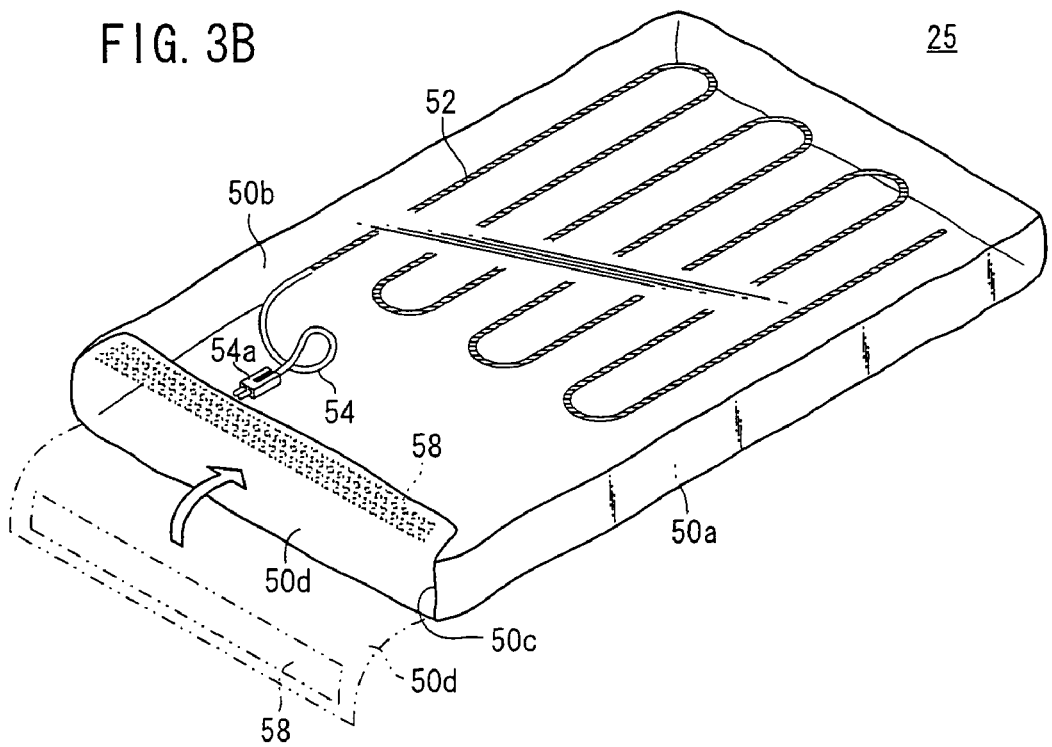
FIG. 3B is a perspective view of the cassette storage bag shown in FIG. 3A, as viewed from a rear side thereof.

FIG. 3A shows in perspective the cassette storage bag 25 of the cassette device 10 as viewed from a front side thereof, and FIG. 3B shows in perspective the cassette storage bag 25 shown in FIG. 3A, as viewed from a rear side thereof. The cassette storage bag 25 serves as a cover for storing the radiation detecting cassette 24. The cassette storage bag 25 prevents body fluids, blood, and other liquids from entering into the radiation detecting cassette 24, and is securely sterilized to prevent hospital infections from affecting the patient 14. Usually, the cassette storage bag 25 will be thrown away once it is used. The cassette storage bag 25 must be made of a material that is highly permeable to radiation X. The cassette storage bag 25 preferably should be transparent or semi-transparent to allow the radiation detecting cassette 24 stored therein to be seen from outside of the cassette device 10, and preferably is flexible for easy handling. For example, the cassette storage bag 25 is made of a resin material, such as polypropylene or the like.

The cassette storage bag 25 has an antenna 52 disposed on the rear (bottom) wall 50b thereof, which is opposite to the front wall 50a that faces the irradiated surface 36 of the radiation detecting cassette 24. The transmission and reception controller 48 sends and receives signals for wireless communications through the antenna 52. In the present embodiment, the antenna 52 comprises a printed antenna, which is printed on an inner surface of the rear wall 50b. The antenna 52 has specifications and a shape adapted to the frequency and wavelength of the signals used for wireless communications. The antenna 52 may alternatively be printed on the outer surface of the rear wall 50b.

Figure 4:
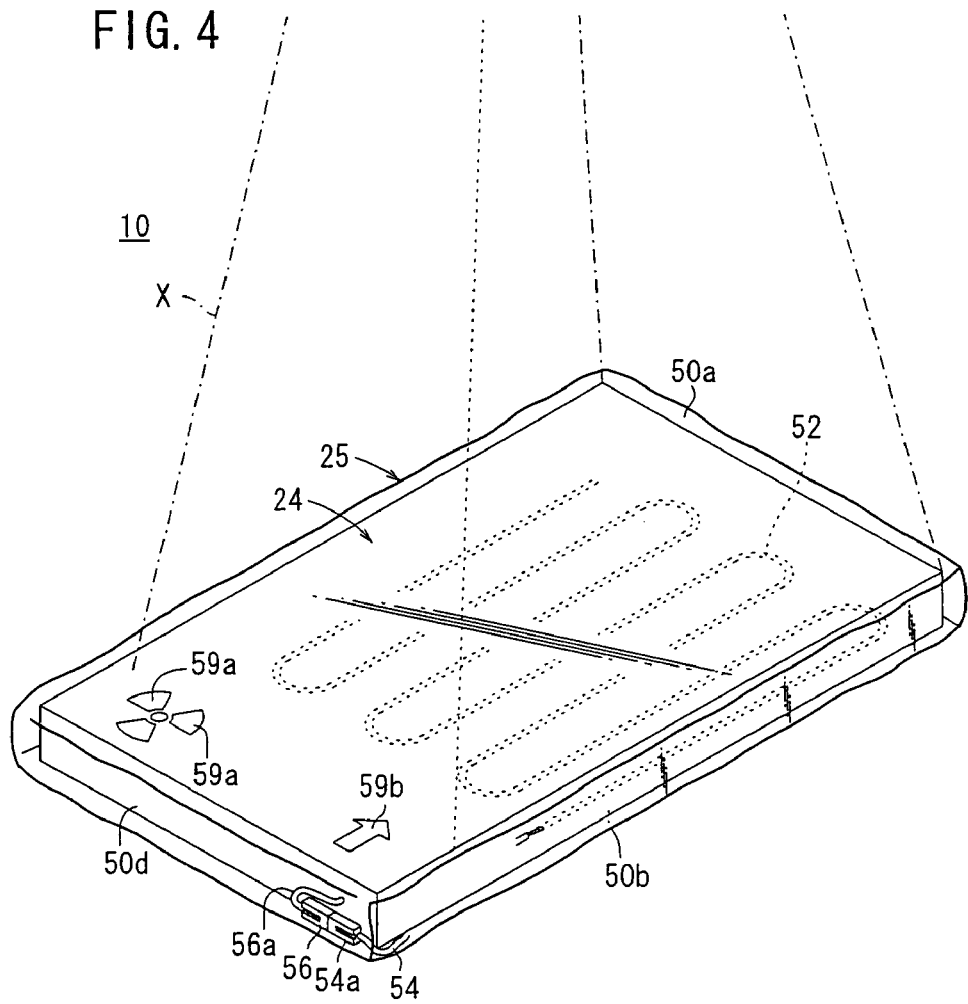
FIG. 4 is a perspective view of the cassette device shown in FIG. 1, in which the radiation detecting cassette is stored in the cassette storage bag.

The antenna 52 has one end thereof connected to an end of a communication wire 54, with the opposite end of the communication wire 54 being connected to a connector 54a. The connector 54a is removably connectable within the cassette storage bag 25 to a connector 56a (see FIG. 2), which is connected to an end of a communication wire 56 that extends from the transmission and reception controller 48 of the radiation detecting cassette 24, as shown in FIG. 4. The connectors 54a, 56a serve as male and female couplings, respectively, which, when connected to each other, electrically interconnect the communication wire 54 connected to the antenna 52 and the communication wire 56 connected to the transmission and reception controller 48. When the communication wires 54, 56 are connected electrically to each other by the connectors 54a and 56a, the antenna 52 functions as an antenna for enabling wireless communications with the transmission and reception controller 48.

The cassette storage bag 25 has an opening 50c defined in one end thereof for permitting the radiation detecting cassette 24 to be inserted through the opening 50c into the cassette storage bag 25. The opening 50c can be closed by a lid 50d provided as an extension of the front wall 50a. The lid 50d can be folded and attached firmly to the rear wall 50b by a sealing tape (a bonding member or an attachment member) 58, so as to seal the radiation detecting cassette 24 in the cassette storage bag 25. The front wall 50a of the cassette storage bag 25 is printed with a mark 59a thereon, which indicates the surface 36 of the casing 34 intended to be irradiated, as well as a mark 59b that indicates the direction in which the radiation detecting cassette 24 is to be inserted into the cassette storage bag 25. The marks 59a, 59b are made of a material permeable to the radiation X. The marks 59a, 59b enable the surgeons 18 or a radiological technician to insert the radiation detecting cassette 24 into the cassette storage bag 25 in a proper manner.

Figure 5:
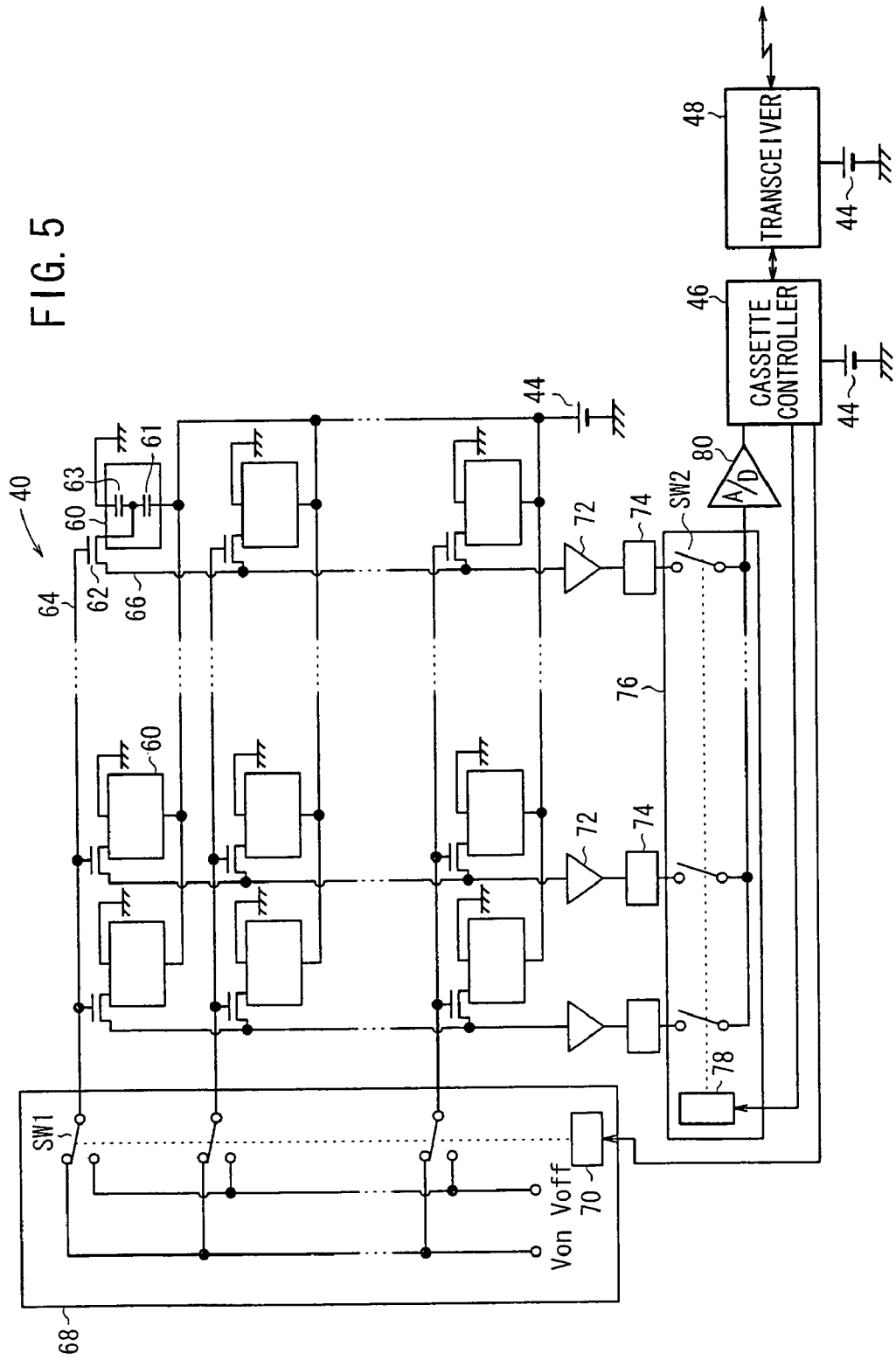
FIG. 5 is a block diagram of a circuit arrangement for a radiation detector of the radiation detecting cassette shown in FIG. 2.

FIG. 5 shows in block form a circuit arrangement for the radiation detector 40. As shown in FIG. 5, the radiation detector 40 comprises an array of thin-film transistors (TFTs) 62 arranged in rows and columns, a photoelectric conversion layer 61 made of a material such as amorphous selenium (a-Se) for generating electric charges upon detecting the radiation X, the photoelectric conversion layer 51 being disposed on the array of TFTs 62, and an array of storage capacitors 63, which is connected to the photoelectric conversion layer 61. When radiation X is applied to the radiation detector 40, the photoelectric conversion layer 61 generates electric charges, and the storage capacitors 63 store the generated electric charges. Then, the TFTs 62 are turned on, each row at a time, in order to read the electric charges from the storage capacitors 63 as an image signal. In FIG. 5, the photoelectric conversion layer 61 and one of the storage capacitors 63 are shown as making up an individual pixel 60, wherein the pixel 60 is connected to one of the TFTs 62. Details of the other pixels 60 have been omitted from illustration. Since amorphous selenium tends to be changed in structure and lose its function at high temperatures, amorphous selenium needs to be used within a certain temperature range. Therefore, a means for cooling the radiation detector 40 preferably should be provided in the radiation detecting cassette 24.

The TFTs 62 connected to the respective pixels 60 are connected to respective gate lines 64 extending parallel to the rows, and respective signal lines 66 extending parallel to the columns. The gate lines 64 are connected to a line scanning driver 68, whereas the signal lines 66 are connected to a multiplexer 76 serving as a reading circuit.

The gate lines 64 are supplied with control signals Von, Voff from the line scanning driver 68, for turning on and off the TFTs 62 along the rows. The line scanning driver 68 comprises a plurality of switches SW1 for switching between the gate lines 64, and an address decoder 70 for outputting a selection signal for selecting one of the switches SW1 at a time. The address decoder 70 is supplied with an address signal from the cassette controller 46.

The signal lines 66 are supplied with electric charges, which are stored in the storage capacitors 63 of the pixels 60, through the TFTs 62 arranged in the columns. The electric charges supplied to the signal lines 66 are amplified by amplifiers 72 connected respectively to the signal lines 66. The amplifiers 72 are connected through respective sample and hold circuits 74 to the multiplexer 76. The multiplexer 76 comprises a plurality of switches SW2 for successively switching between the signal lines 66, and an address decoder 78 for outputting a selection signal for selecting one of the second switches SW2 at a time. The address decoder 78 is supplied with an address signal from the cassette controller 46. The multiplexer 76 has an output terminal connected to an A/D converter 80. A radiation image signal generated by the multiplexer 76 based on the electric charges from the sample and hold circuits 74 is converted by the A/D converter 80 into a digital image signal representing the radiation image information, which is supplied to the cassette controller 46.

Figure 6:
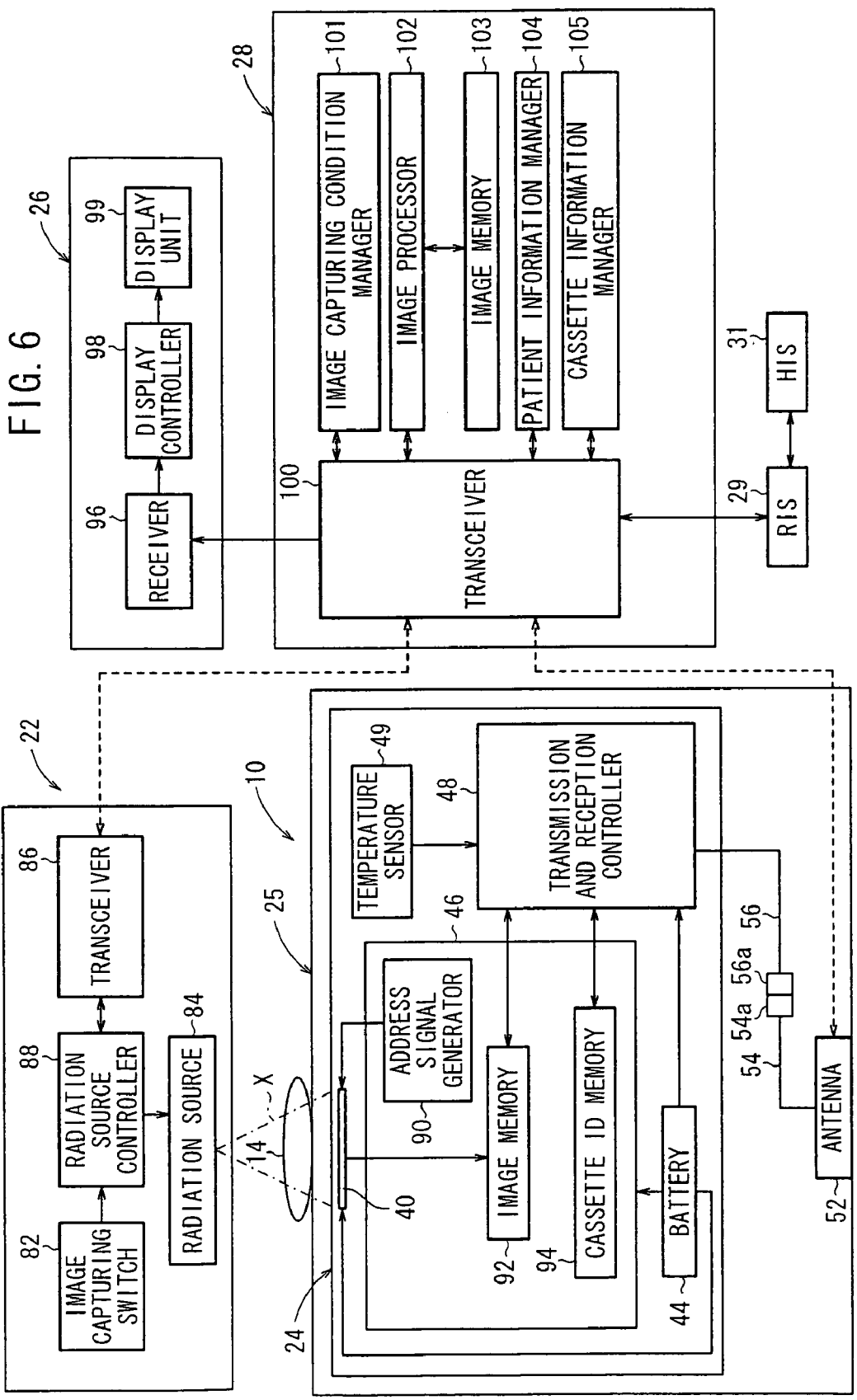
FIG. 6 is a block diagram of the radiation image capturing system shown in FIG. 1.

FIG. 6 shows in block form a radiation image capturing system 12, which comprises the image capturing apparatus 22, the cassette device 10 (the radiation detecting cassette 24), the display device 26, and the console 28. The console 28 is connected to a radiology information system (RIS) 29, which generally manages radiation image information handled by the radiological department of a hospital along with other information. The RIS 29 is connected to a hospital information system (HIS) 31, which generally manages medical information in the hospital.

The image capturing apparatus 22 comprises an image capturing switch 82, a radiation source 84 for outputting radiation X, a transceiver 86 for receiving image capturing conditions from the console 28 by way of wireless communications, and which transmits an image capturing completion signal, etc., to the console 28 by way of wireless communications, and a radiation source controller 88, which controls the radiation source 84 based on an image capturing start signal supplied from the image capturing switch 82 and image capturing conditions supplied from the transceiver 86.

The radiation detecting cassette 24 of the cassette device 10 houses therein the radiation detector 40, the battery 44, the cassette controller 46, and the transmission and reception controller (transmitting unit) 48. The cassette controller 46 comprises an address signal generator 90 that supplies address signals to the address decoder 70 of the line scanning driver 68 as well as to the address decoder 78 of the multiplexer 76 of the radiation detector 40, an image memory 92 for storing radiation image information detected by the radiation detector 40, and a cassette ID memory 94 for storing cassette ID information for identifying the radiation detecting cassette 24. The transmission and reception controller 48, which is connected electrically by the connectors 54a, 54b to the antenna 52 of the cassette storage bag 25 of the cassette device 10, receives a transmission request signal from the console 28 by way of wireless communications, and transmits cassette ID information stored in the cassette ID memory 94 along with radiation image information stored in the image memory 92 to the console 28 by way of wireless communications.

The display device 26 comprises a receiver 96 that receives radiation image information from the console 28, a display controller 98 for controlling display of the received radiation image information, and a display unit (warning means) 99 for displaying radiation image information processed by the display controller 98.

The console 28 comprises a transceiver 100 for transmitting and receiving necessary information, including radiation image information, to and from the image capturing apparatus 22, the cassette device 10 (radiation detecting cassette 24), and the display device 26, by way of wireless communications. The console 28 further comprises an image capturing condition manager 101 for managing image capturing conditions required for the image capturing apparatus 22 to capture radiation images, an image processor 102 for processing radiation image information transmitted from the radiation detecting cassette 24, an image memory 103 for storing the radiation image information processed by the image processor 102, a patient information manager 104 for managing patient information of the patient 14 whose images are to be captured, and a cassette information manager (managing means) 105 for managing cassette information, including an accumulated exposed dosage, transmitted from the radiation detecting cassette 24. The console 28 may be located outside of the operating room 13, insofar as the console 28 can transmit and receive signals to and from the image capturing apparatus 22, the cassette device 10 (radiation detecting cassette 24), and the display device 26 by way of wireless communications.

Image capturing conditions refer to conditions for determining a tube voltage, a tube current, an irradiation time, etc., required to apply radiation X at an appropriate dosage to an area to be imaged of the patient 14. The image capturing conditions may include an area to be imaged of the patient 14, an image capturing method, etc., for example. Patient information refers to information for identifying the patient 14, such as the name, gender, patient ID number, etc., of the patient 14. Ordering information for instructing the radiation image capturing system 12 to capture a radiation image, including the image capturing conditions and the patient information, can be set directly via the console 28, or can be supplied from an external source to the console 28 via the RIS 29. Cassette information refers to cassette ID information or the like for identifying the radiation detecting cassette 24.

The radiation image capturing system 12 incorporating the cassette device 10 according to the present embodiment is basically constructed as described above. Operations of the radiation image capturing system 12 shall be described below.

The radiation image capturing system 12 is installed in an operating room 13 and used when a radiation image of the patient 14 is required by the surgeons 18 who are performing an operation on the patient 14. Before a radiation image of the patient 14 is captured, patient information concerning the patient 14 to be imaged is registered in the patient information manager 104 of the console 28. If the area to be imaged of the patient 14 and the image capturing method already are known, they are registered as image capturing conditions in the image capturing condition manager 101. After the above preparatory process is finished, the surgeons 18 perform an operation on the patient 14.

For capturing a radiation image of the patient 14 during an operation, one of the surgeons 18, or a radiological technician, places the cassette device 10 between the patient 14 and the surgical table 16 with the irradiated surface 36 facing the image capturing apparatus 22. Specifically, before the cassette device 10 is used, one of the surgeons 18 or the radiological technician holds the irradiated surface 36 of the radiation detecting cassette 24 in alignment with the front wall 50a of the cassette storage bag 25, while also holding the rear surface of the radiation detecting cassette 24 in alignment with the rear wall 50b (the antenna 52) of the cassette storage bag 25, by referring to the marks 59a, 59b. The surgeon 18 or the radiological technician then inserts the radiation detecting cassette 24 into the cassette storage bag 25, which has been sterilized beforehand. Then, the surgeon 18 or the radiological technician joins the connector 56a on the communication wire 56 extending from the transmission and reception controller 48 of the radiation detecting cassette 24 to the connector 54a on the communication wire 54 extending from the antenna 52 of the cassette storage bag 25, and securely closes the lid 50d over the opening 50c with the sealing tape 58. The cassette device 10, with the radiation detecting cassette 24 sealed in the cassette storage bag 25, is now prepared.

Then, after the image capturing apparatus 22 has been moved to a position confronting the cassette device 10, one of the surgeons 18, or a radiological technician, turns on the image capturing switch 82 in order to capture a radiation image of the patient 14.

The radiation source controller 88 of the image capturing apparatus 22 acquires image capturing conditions concerning the area of the patient 14 to be imaged from the image capturing condition manager 101 of the console 28 via the transceivers 100, 86. When the radiation source controller 88 receives such image capturing conditions, the radiation source controller 88 controls the radiation source 84 to apply radiation X at a given dosage to the patient 14 according to the image capturing conditions.

Radiation X that has passed through the patient 14 passes through the front wall 50a of the cassette storage bag 25 and is applied to the grid 38, which removes scattered rays from the radiation X. Then, the radiation X is applied to the radiation detector 40 and converted into electric signals by the photoelectric conversion layer 61 of the pixels 60 of the radiation detector 40. The electric signals are stored as electric charges in the storage capacitors 63 (see FIG. 5). The stored electric charges, which represent radiation image information of the patient 14, are read from the storage capacitors 63 according to address signals, which are supplied from the address signal generator 90 of the cassette controller 46 to the line scanning driver 68 and to the multiplexer 76.

Specifically, in response to the address signal supplied from the address signal generator 90, the address decoder 70 of the line scanning driver 68 outputs a selection signal so as to select one of the switches SW1, which supplies the control signal Von to the gates of the TFTs 62 that are connected to the gate line 64 corresponding to the selected switch SW1. In response to the address signal supplied from the address signal generator 90, the address decoder 78 of the multiplexer 76 outputs a selection signal, so as to successively turn on the switches SW2 and switch between the signal lines 66, for thereby reading through the signal lines 66 electric charges stored in the storage capacitors 63 of the pixels 60 that are connected to the selected gate line 64.

The electric charges read from the storage capacitors 63 of the pixels 60 connected to the selected gate line 64 are amplified by respective amplifiers 72, sampled by the sample and hold circuits 74, and supplied to the multiplexer 76. Based on the supplied electric charges, the multiplexer 76 generates and supplies a radiation image signal to the A/D converter 80, which converts the radiation image signal into a digital signal. The digital signal, which represents the radiation image information, is stored in the image memory 92 of the cassette controller 46.

Similarly, the address decoder 70 of the line scanning driver 68 successively turns on the switches SW1 in order to switch between the gate lines 64 according to the address signal supplied from the address signal generator 90. The electric charges stored in the storage capacitors 63 of the pixels 60, which are connected to the successively selected gate lines 64, are read through the signal lines 66, and processed by the multiplexer 76 and the A/D converter 80 into digital signals, which are then stored in the image memory 92 of the cassette controller 46.

The radiation image information represented by digital signals stored in the image memory is transmitted from the image memory 92, through the transmission and reception controller 48, and to the console 28 by way of wireless communications.

The radiation image information transmitted to the console 28 is received by the transceiver 100, processed by the image processor 102, and then stored in the image memory 103, in association with patient information of the patient 14 registered in the patient information manager 104.

The radiation image information processed by the image processor 102 is transmitted from the transceiver 100 to the display device 26. In the display device 26, the receiver 96 receives the radiation image information, and the display controller 98 controls the display unit 99 to display a radiation image based on the radiation image information. The surgeons 18 thus can perform an operation on the patient 14 while visually confirming the radiation image, which is displayed on the display unit 99.

Since no cables for transmitting and receiving signals are connected between the cassette device 10 (radiation detecting cassette 24) and the console 28, between the image capturing apparatus 22 and the console 28, or between the console 28 and the display device 26, there are no cables placed on the floor of the operating room 13. Hence, cable-induced obstacles to operations performed by the surgeons 18, the radiological technician, or other staff members in the operating room 13 do not occur.

With the cassette device 10 according to the present embodiment, since the antenna 52 is provided on the cassette storage bag 25, an antenna does not need to be disposed inside the radiation detecting cassette 24. Thus, the radiation detecting cassette 24 can be relatively simple in structure, light in weight, and low in cost. Particularly, since the radiation detecting cassette 24 houses the battery 44, the cassette controller 46, etc., therein, thus enabling wireless communications to be performed, and allowing radiation images to be displayed directly on the display device 26, the internal structural details of the radiation detecting cassette 24 are made simple, and no antenna is required in the radiation detecting cassette 24, which is highly advantageous. If an antenna were to be needed in the radiation detecting cassette 24, then it could be difficult for such an antenna to have the necessary frequency and wavelength specifications used for wireless communications due to the relationship between the antenna and the layout of the battery 44 and other devices inside the radiation detecting cassette 24. According to the present embodiment, however, since the antenna 52 is provided on the cassette storage bag 25, the antenna 52 can easily be constructed with a shape suitable for the frequency and wavelength characteristics of signals used in wireless communications. Accordingly, the stability of wireless communications between the radiation detecting cassette 24 and the console 28 is increased, thereby allowing high-quality radiation images to be displayed on the display device 26.

Furthermore, inasmuch as the antenna 52 is mounted on the rear wall 50b of the cassette storage bag 25, which is remote from the irradiated surface 36 of the radiation detecting cassette 24, radiation X applied to the radiation detector 40 is not absorbed by the antenna 52. The antenna 52 may be located in any position apart from the irradiated surface 36 of the radiation detecting cassette 24, e.g., on a side wall of the radiation detecting cassette 24.

Moreover, since the antenna 52 on the cassette storage bag 25 comprises a printed antenna, the antenna 52 can be manufactured highly efficiently and at a low cost in a small space. Of course, the antenna 52 may also comprise an antenna other than a printed antenna.

Figure 7:
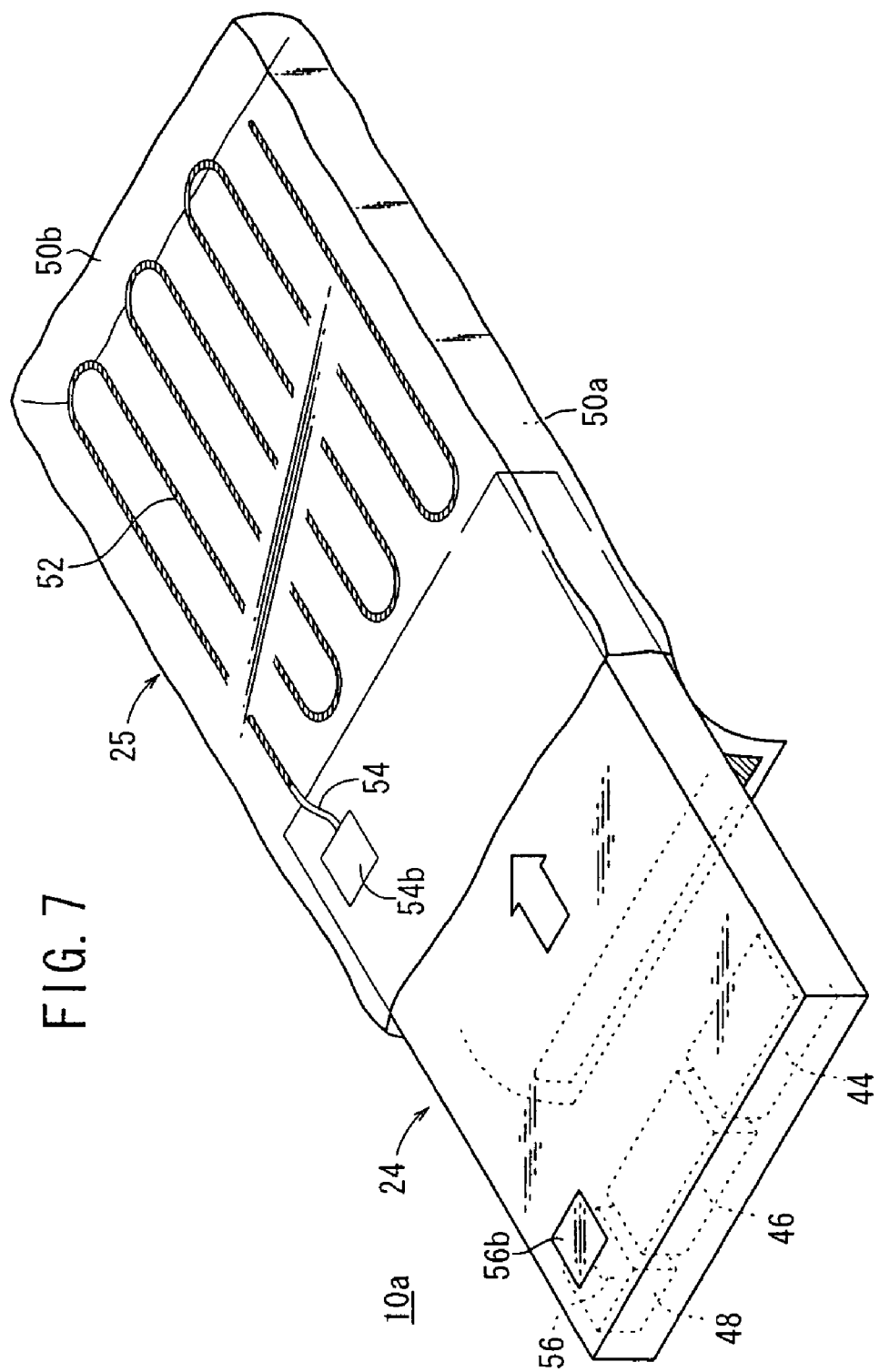
FIG. 7 is a perspective view of a radiation detecting cassette and a cassette storage bag for a cassette device according to a modified example.

The antenna 52 on the cassette storage bag 25 and the transmission and reception controller 48 of the radiation detecting cassette 24 may be connected to each other by couplings other than the connectors 54a, 54b. According to the modification shown in FIG. 7, a cassette device 10a includes a magnet (magnetic material) 56b disposed on the rear wall of the casing 34 of the radiation detecting cassette 24, near to the transmission and reception controller 48, and a thin metal plate 54b disposed on the rear wall 50b of the cassette storage bag 25 in alignment with the magnet 56b. When the thin metal plate 54b is placed over the magnet 56b, the thin metal plate 54b is magnetically attracted to the magnet 56b.

The magnet 56b is connected to the distal end of the communication wire 56 that extends from the transmission and reception controller 48, while the thin metal plate 54b is connected to the distal end of the communication wire 54 that extends from the antenna 52. When one of the surgeons 18 or a radiological technician inserts the radiation detecting cassette 24 into the cassette storage bag 25 in order to seal the radiation detecting cassette 24 therein, the thin metal plate 54b is magnetically attracted to the magnet 56b, thereby automatically connecting the transmission and reception controller 48 electrically to the antenna 52. When the cassette device 10a is prepared for use, therefore, the transmission and reception controller 48 and the antenna 52 are prevented from being left unconnected to each other due to a clerical oversight, for example. The cassette device 10a can thus be handled with greater ease. A thin metal plate may be connected from the transmission and reception controller 48 to the distal end of the communication wire 56, and a magnet may be connected from the antenna 52 to the distal end of the communication wire 54. Alternatively, mutually attractable magnets may be connected to the respective distal ends of the communication wires 54, 56.

In the above embodiment, the radiation image capturing system 12 is used during a surgical operation, whereby captured radiation images of the patient 14 are displayed on the display device 26. However, the radiation image capturing system 12 may also be used to capture ordinary radiation images, at times other than during surgical operations.

In the radiation image capturing system 12 according to the illustrated embodiment, the radiation detector 40 housed in the radiation detecting cassette 24 directly converts the dosage of the applied radiation X into electric signals utilizing the photoelectric conversion layer 61. However, the radiation image capturing system 12 may employ a radiation detector, including a scintillator for converting the applied radiation X into visible light, and a solid-state detecting device made of amorphous silicon (a-Si) or the like for converting the visible light into electric signals (see Japanese Patent No. 3494683). In this case, the cassette storage bag 25 for storing the radiation detecting cassette 24 is preferably a light-shielding bag having a black color or the like. With a cassette storage bag 25 made black, part of external light as visible light is blocked without being applied to the radiation detector housed in the radiation detecting cassette 24, preventing the radiation image information from being deteriorated in accuracy by the part of external light.

Alternatively, the radiation image capturing system 12 may employ a light-conversion radiation detector for acquiring the radiation image information. The light-conversion radiation detector operates as follows: When radiation is applied to a matrix of solid-state detecting devices, the solid-state detecting devices store an electrostatic latent image depending on the dosage of the applied radiation. For reading the stored electrostatic latent image, reading light is applied to the solid-state detecting devices, so as to cause the solid-state detecting devices to generate electric currents representing the radiation image information. When erasing light is applied to the radiation detector, the radiation image information, representing a residual electrostatic latent image, is erased from the radiation detector, so that the radiation detector can be reused (see Japanese Laid-Open Patent Publication No. 2000-105297).

Signals may be sent and received between the image capturing apparatus 22, the display device 26, and the console 28, by way of wired communications.

Figure 8:
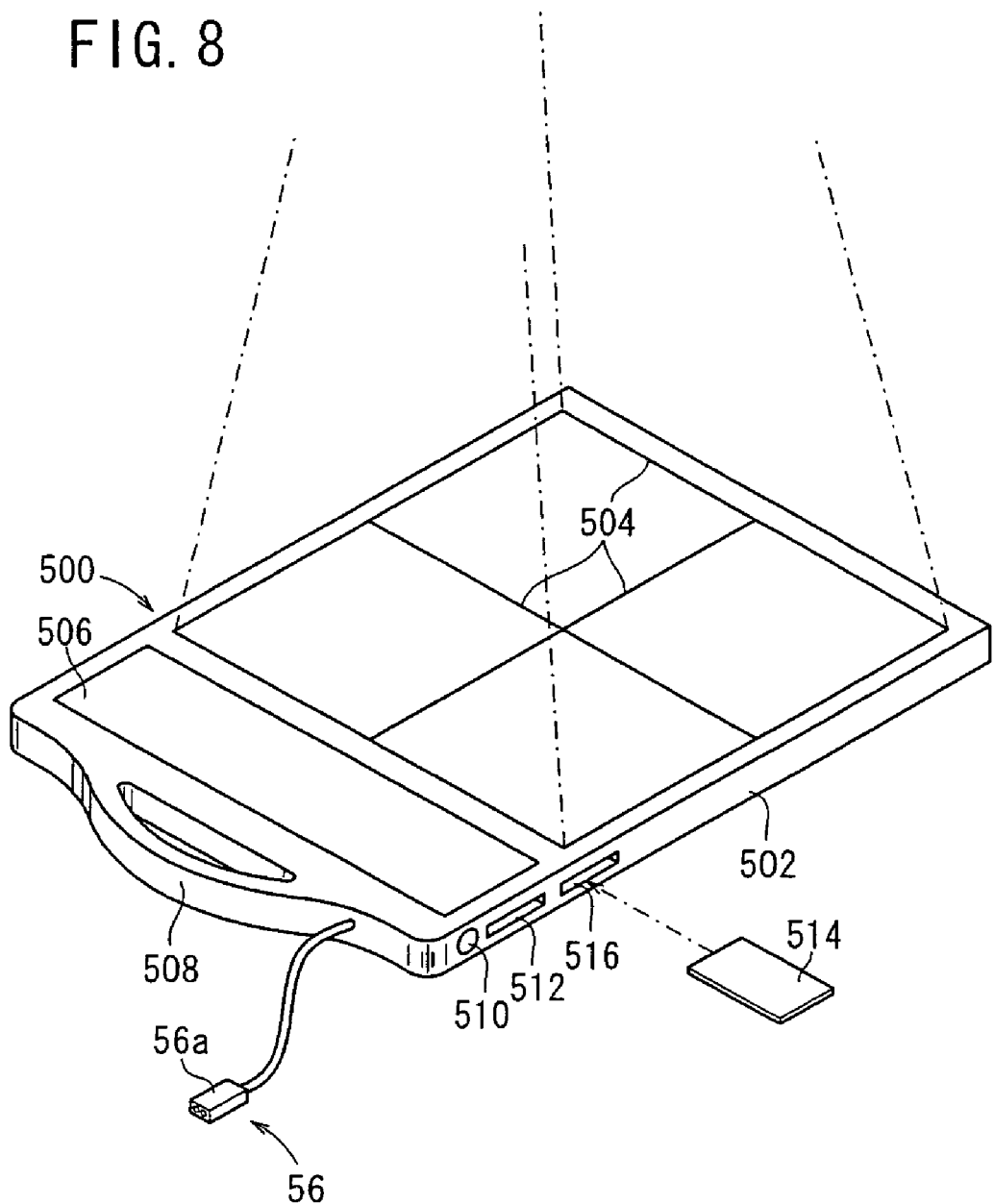
FIG. 8 is a perspective view of a radiation detecting cassette according to another embodiment of the present invention.

FIG. 8 shows in perspective a radiation detecting cassette 500 according to another embodiment of the present invention.

As shown in FIG. 8, the radiation detecting cassette 500 has guide lines 504 disposed on the irradiated surface of a radiation detecting cassette 500. The guide lines 504 serve as a reference for determining an image capturing area and an image capturing position. Using the guide lines 504, a subject to be imaged is positioned with respect to the radiation detecting cassette 500, and an area to which the radiation will be applied is established, thereby enabling the radiation image information to be recorded in an appropriate image capturing area on the radiation detecting cassette 500.

The radiation detecting cassette 500 also includes a display unit 506 disposed thereon, outside of the image capturing area, for displaying various items of information concerning the radiation detecting cassette 500. For example, the display unit 506 displays ID information of the subject whose radiation image is recorded in the radiation detecting cassette 500, the number of times that the radiation detecting cassette 500 has been used, an accumulated exposed dosage, the charge state (remaining power level) of the battery 44 housed in the radiation detecting cassette 500, image capturing conditions for the radiation image information, and a positioning image that represents where the subject should be positioned with respect to the radiation detecting cassette 500, etc. A radiological technician can confirm the subject based on the ID information displayed on the display unit 506, and also confirm in advance that the radiation detecting cassette 500 is in a usable state. Further, the radiological technician can position the desired area of the subject to be imaged with respect to the radiation detecting cassette 500, based on the displayed positioning image, in order to capture optimum radiation image information in the radiation detecting cassette 500.

The radiation detecting cassette 500 includes a handle 508, which is capable of being gripped by the user to handle and carry the radiation detecting cassette 500 with ease.

The radiation detecting cassette 500 also has an input terminal 510 for connection to an AC adapter, a USB (Universal Serial Bus) terminal 512, and a card slot 516 for receiving a memory card 514 therein, all of which are provided on a side wall of the casing of the radiation detecting cassette 500.

When the charge of the battery 44 housed in the radiation detecting cassette 500 is low, or when there is not enough time for charging the battery 44, an AC adapter may be connected to the input terminal 510 in order to supply electric power from an external source, thereby making the radiation detecting cassette 500 immediately operable.

The USB terminal 512 or the card slot 516 can be used as an alternative when the radiation detecting cassette 500 is unable to send and receive information to and from an external device, such as the console 28 or the like, by way of wireless communications. Specifically, when a USB cable connected to the external device is connected to the USB terminal 512, the radiation detecting cassette 500 can send and receive information to and from the external device by way of wired communications through the USB terminal 512 and the USB cable. Alternatively, the memory card 514 may be inserted into the card slot 516, whereby necessary information from the radiation detecting cassette 500 is recorded in the memory card 514. Thereafter, the memory card 514 is disconnected from the radiation detecting cassette 500 and reconnected to the external device in order to send information to the external device.

Figure 9:
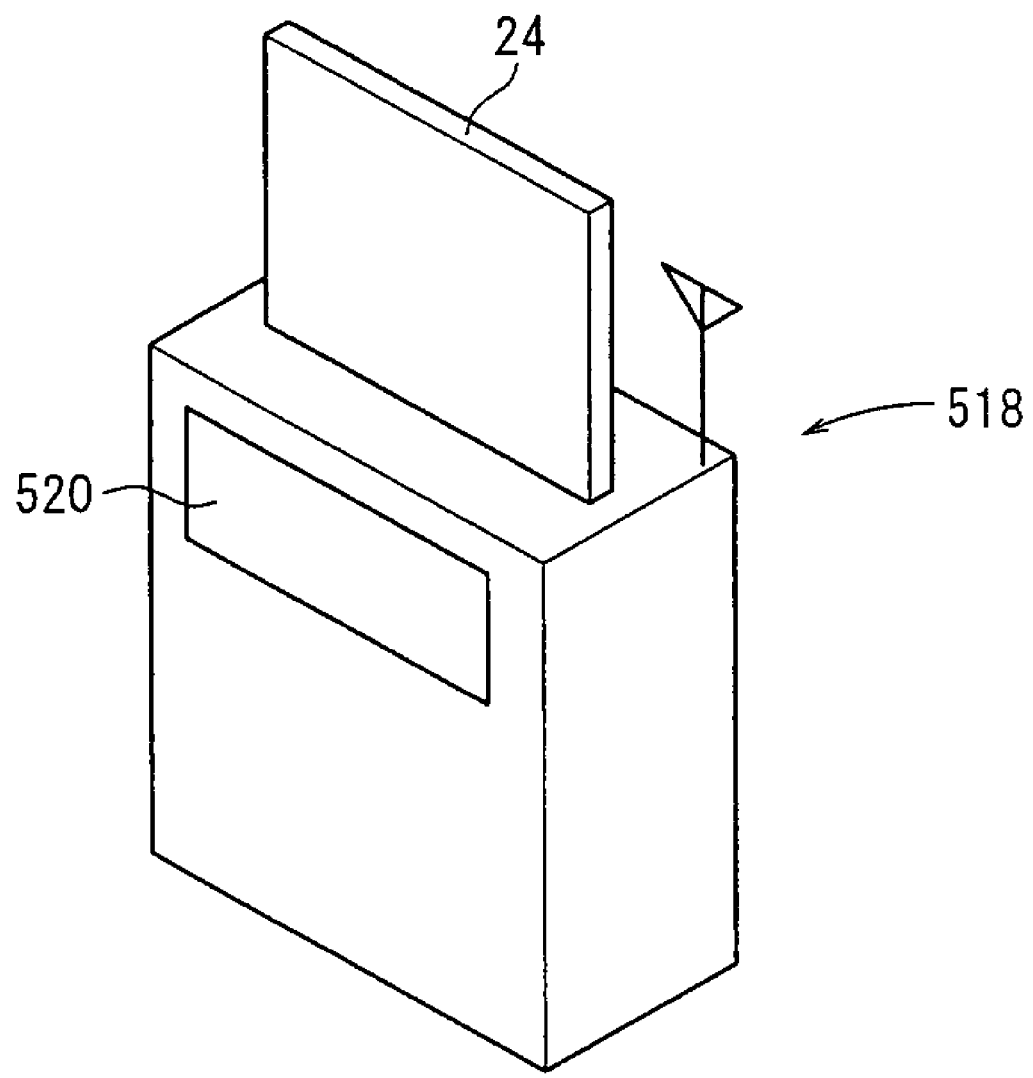
FIG. 9 is a perspective view of a cradle used for charging a battery in the radiation detecting cassette.

FIG. 9 shows a cradle 518 for charging the battery 44 housed in the radiation detecting cassette 24 or 500. The cradle 518 is positioned in the operating room 13 or at another desired location in the hospital. The cradle 518 not only enables charging of the battery 44, but also includes a wireless or wired communication function in order to send and receive necessary information to and from an external device, such as the HIS 31, the RIS 29, the console 28, or the like. Information that is sent from the cradle 518 may include radiation image information, which is recorded in the radiation detecting cassette 24, 500 loaded in the cradle 518.

The cradle 518 includes a display unit 520 for displaying the charged state of the battery 44 housed in the radiation detecting cassette 24, 500, as well as other necessary information including radiation image information acquired from the radiation detecting cassette 24, 500.

A plurality of cradles 518 may be connected to a network, so that the charged states of the batteries 44 housed in the radiation detecting cassettes 24, 500 and loaded into the respective cradles 518 can be retrieved through the network. Thus, the user can confirm the locations of radiation detecting cassettes 24, 500 having batteries 44 therein that are sufficiently charged, based on the retrieved charged states of the batteries 44.

Although certain preferred embodiments of the present invention have been shown and described in detail, it should be understood that various changes and modifications may be made to the embodiments without departing from the scope of the invention as set forth in the appended claims.

What is claimed is:

1. A cassette device comprising:
   a radiation detecting cassette having a radiation conversion panel for detecting radiation that has passed through a subject and converting the detected radiation into radiation image information, and a transmitting unit connected to said radiation conversion panel for transmitting said radiation image information to an image processor by way of wireless communications; and
   a cassette storage bag for storing said radiation detecting cassette,
   wherein said cassette storage bag includes an antenna for transmitting said radiation image information from said transmitting unit to said image processor by way of wireless communications, and
   wherein said transmitting unit and said antenna are electrically connectable to each other through detachable couplings.

2. A cassette device according to claim 1, wherein said couplings comprise connectors, respectively, for engaging respective distal ends of a communication wire extending from said transmitting unit and a communication wire extending from said antenna.

3. A cassette device according to claim 1, wherein said couplings comprise magnetic couplings, respectively, mounted on respective distal ends of a communication wire extending from said transmitting unit and a communication wire extending from said antenna, at least one of said magnetic couplings being made of a magnetic material that is magnetically attracted to the other of the magnetic couplings, for thereby electrically connecting said communication wires to each other.

4. A cassette device according to claim 1, wherein said antenna comprises a printed antenna, which is printed on said cassette storage bag.

5. A cassette device according to claim 1, wherein said antenna is disposed on a rear wall of said cassette storage bag opposite to a surface of said radiation detecting cassette that is irradiated with said radiation while said radiation detecting cassette is stored in said cassette storage bag.

6. A cassette storage bag for storing a radiation detecting cassette having a radiation conversion panel for detecting radiation that has passed through a subject and converting the detected radiation into radiation image information, and a transmitting unit connected to said radiation conversion panel for transmitting said radiation image information to an image processor by way of wireless communications, said cassette storage bag comprising:
   an antenna for transmitting said radiation image information from said transmitting unit to said image processor by way of wireless communications, said antenna being electrically connectable to said transmitting unit by a detachable coupling.

7. A cassette storage bag according to claim 6, wherein said coupling comprises a connector for engaging a communication wire that extends from said transmitting unit.

8. A cassette storage bag according to claim 6, wherein said coupling comprises a magnetic connector for magnetically attracting and connecting to a communication wire that extends from said transmitting unit.

9. A cassette storage bag according to claim 6, wherein said antenna comprises a printed antenna, which is printed on said cassette storage bag.

10. A cassette storage bag according to claim 6, wherein said antenna is disposed on a rear wall of said cassette storage bag opposite to a surface of said radiation detecting cassette that is irradiated with said radiation while said radiation detecting cassette is stored in said cassette storage bag.

11. A cassette storage bag according to claim 10, wherein said cassette storage bag bears a marking thereon, which indicates said surface of said radiation detecting cassette that is irradiated with said radiation, or which indicates said rear wall of said cassette storage bag.

* * * * *